United States Patent
Jackson

(10) Patent No.: US 8,629,878 B2
(45) Date of Patent: Jan. 14, 2014

(54) EXTENSION TO A HYPERVISOR THAT UTILIZES GRAPHICS HARDWARE ON A HOST

(75) Inventor: Adam D. Jackson, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 1176 days.

(21) Appl. No.: 12/548,299

(22) Filed: Aug. 26, 2009

(65) Prior Publication Data

US 2011/0050712 A1    Mar. 3, 2011

(51) Int. Cl.
*G06T 15/00* (2011.01)

(52) U.S. Cl.
USPC ................................. 345/522; 718/1; 718/104

(58) Field of Classification Search
USPC ....................................... 345/522; 718/1, 104
See application file for complete search history.

(56) References Cited

U.S. PATENT DOCUMENTS

2006/0146057 A1* 7/2006 Blythe .......................... 345/506
2010/0013839 A1* 1/2010 Rawson ........................ 345/502

OTHER PUBLICATIONS

Abramson, D., et al., "Intel® Virtualization Technology for Directed I/O". Intel Technology Journal, vol. 10, Issue 3 (Aug. 10, 2006) 179-192.

* cited by examiner

*Primary Examiner* — Maurice L McDowell, Jr.
(74) *Attorney, Agent, or Firm* — Lowenstein Sandler LLP

(57) ABSTRACT

Graphics rendering in a virtual machine system is accelerated by utilizing host graphics hardware. In one embodiment, the virtual machine system includes a server that hosts a plurality of virtual machines. The server includes one or more graphics processing units. Each graphics processing unit can be allocated to multiple virtual machines to render images. A hypervisor that runs on the server is extended to include a redirection module, which receives a rendering request from a virtual machine and redirects the rendering request to a graphics driver. The graphics driver can commands an allocated portion of a graphics processing unit to render an image on the server.

19 Claims, 4 Drawing Sheets

EXTENSION TO A HYPERVISOR THAT UTILIZES GRAPHICS HARDWARE ON A HOST

TECHNICAL FIELD

Embodiments of the present invention relate to virtual machines, and more specifically, to graphics processing in a virtual machine environment.

BACKGROUND

Virtualization allows multiplexing of an underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor, or a host operating system. The hypervisor emulates the underlying hardware of the host computer, making the use of the virtual machine transparent to the guest operating system and the user of the computer.

Virtual machines can be provided by a centralized host that is coupled to multiple clients over a network. A virtual machine can provide a virtual desktop for a client and executes graphics operations relating to the virtual desktop. Conventional techniques render graphics either remotely on the client, or locally by software on the host. Graphics rendering by software on the host consumes host CPU cycles. However, it is sometimes necessary to render graphics on the host before the rendered pixels are transmitted to the client for viewing. Host performance can be significantly degraded when multiple virtual machines render graphics by software on the host at the same time.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
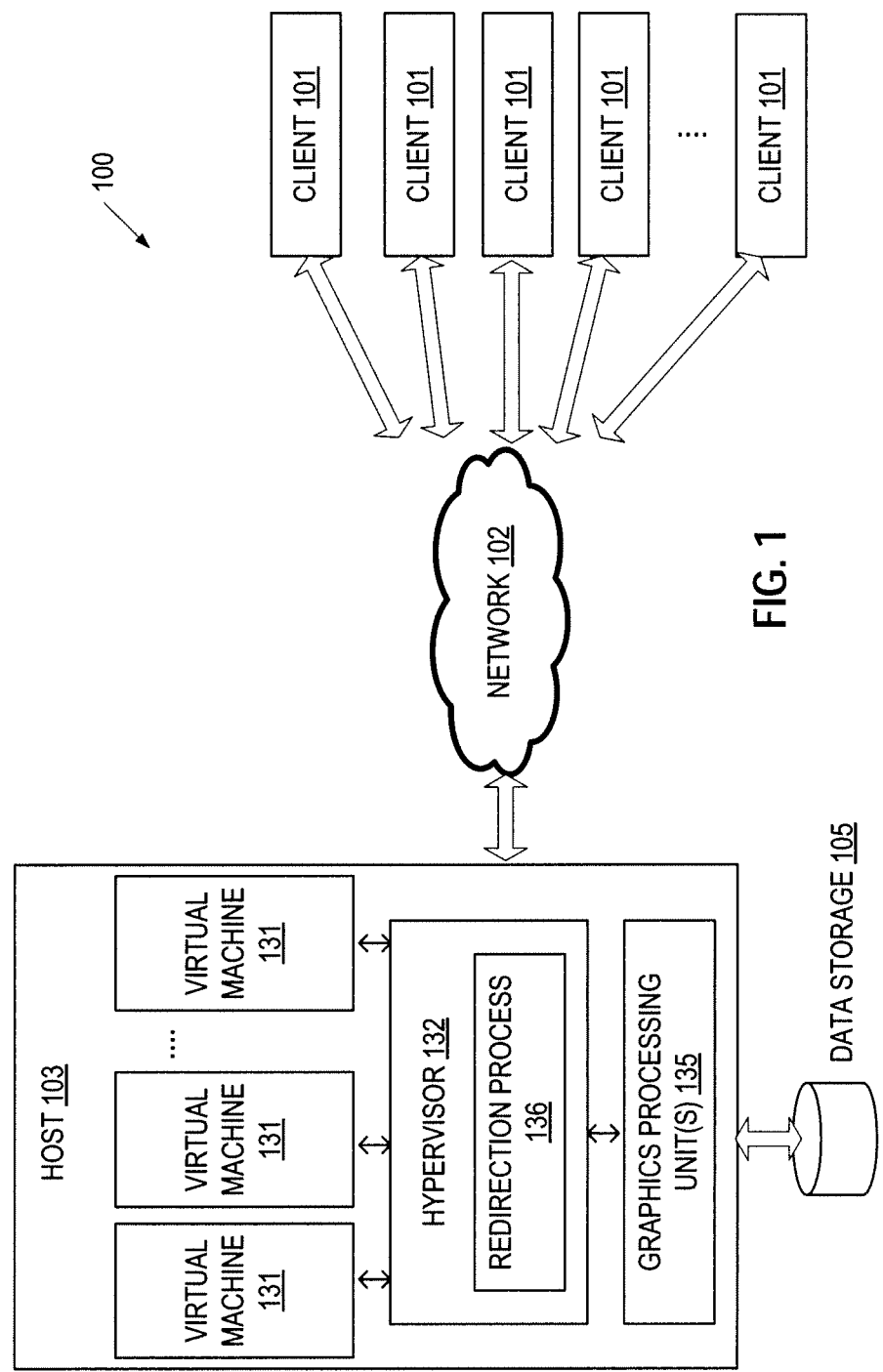
FIG. 1 illustrates an exemplary network architecture in which embodiments of the present invention may operate.

Described herein is a method and system for accelerating graphics rendering in a virtual machine system by utilizing host graphics hardware. In one embodiment, the virtual machine system includes a server that hosts a plurality of virtual machines. The server includes one or more graphics processing units. Each graphics processing unit can be allocated to multiple virtual machines to render images. A hypervisor that runs on the server is extended to include a redirection module, which receives a rendering request from a virtual machine and redirects the rendering request to a graphics driver. The graphics driver can commands an allocated portion of a graphics processing unit to render an image on the server.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "redirecting", "causing", "allocating", "receiving", "translating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 includes a host 103 coupled to one or more clients 101 over a network 102. The network 102 may be a private network (e.g., a local area network (LAN), wide area network (WAN), intranet, etc.) or a public network (e.g., the Internet). The host 103 is also coupled to a data storage 105.

In one embodiment, the clients 101 may include computing devices that have a wide range of capabilities. Some of the clients 101 may be thin clients, which serve as access terminals for users and depend primarily on the host 103 for processing activities. A thin client has limited processing and memory capacities. For example, a thin client may be a laptop computer, cellular phone, personal digital assistant (PDA), a re-purposed desktop computer, etc. Some of the clients 101 may be thick (fat) clients, which have graphics processors, powerful CPUs and large memory. For example, a thick client may be a dual-core or multi-core computer, workstation, graphics workstation, etc. The client 101 may run client applications such as a Web browser and a graphic user interface (GUI). The client 101 may also run other client applications, which receive multimedia data streams or other data from the host 103 and re-direct the received data to a local display or other user interface.

In one embodiment, the host 103 includes a server or a cluster of servers to host one or more virtual machines 131. Each virtual machine 131 runs a guest operating system (OS) that may be different from one another. The guest OS may include Microsoft Windows, Linux, Solaris, Mac OS, etc. The host 103 may include a hypervisor 132 that emulates the underlying hardware platform for the virtual machines 131. The hypervisor 132 may also be known as a virtual machine monitor (VMM) or a kernel-based hypervisor. In some embodiments, the hypervisor 132 may be part of the host operating system.

Each virtual machine 131 can be accessed by one or more of the clients 101 over the network 102. Each virtual machine 131 executes operations for a client. In one scenario, each virtual machine 131 provides a virtual desktop for the client 101 and executes some or all of the graphics operations relating to the virtual desktop. From the user's point of view, the virtual desktop functions as a physical desktop (e.g., a personal computer) and is indistinguishable from a physical desktop.

According to one embodiment of the present invention, the hypervisor 132 includes a redirection module 136 to redirect a rendering request from the guest OS to the host's graphics driver, such that the host's graphics hardware can be utilized for rendering. Conventionally, the rendering request is sent to the hypervisor 132, which emulates the rendering operation in software on the host's CPU. The graphics hardware on the host 103 is much more efficient at rendering than the CPU. Rendering graphics on graphics hardware can remove CPU load and accelerate rendering. CPU usage is a critical measure of system performance: the less CPU each guest OS consumes, the more virtual machines 131 can run on a single host, and thus the fewer and/or cheaper host machines an organization needs to purchase.

Figure 2:
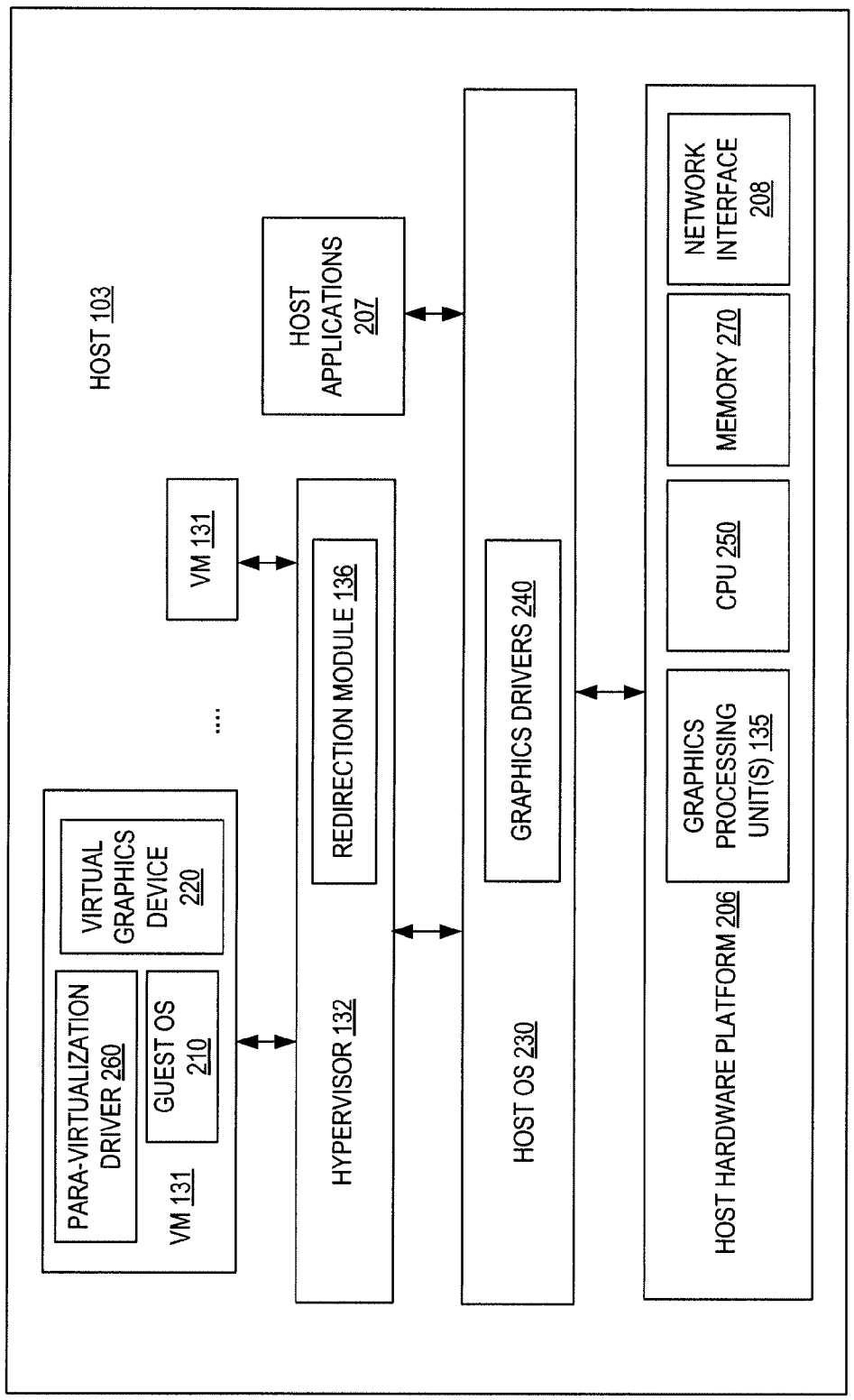
FIG. 2 is a block diagram illustrating one embodiment of a server that hosts multiple virtual machines.

FIG. 2 is a block diagram illustrating an embodiment of the host 103 in greater detail. Although one virtual machine (VM) 131 is shown, it is understood that the host 103 can support any number of virtual machines 131. The host 103 includes a central processing unit (CPU) 250, memory 270 and one or more graphics processing units 135 (e.g., graphics card or graphics processors) on a host hardware platform 206, and runs a number of host applications 207. The host hardware platform 206 also includes a network interface 208 to communicate with the remote clients 101. A host OS 230 runs on the hardware platform 206 to manage various resources for the host 103. The host OS 230 also includes one or more graphics drivers 240 (e.g., the X server) for communicating with the graphics processing units 135. The host 103 further includes the hypervisor 132 to emulate the hardware platform 206 for the virtual machines 131. Although the hypervisor 132 is shown as a separate element from the host OS 230, it is understood that the hypervisor 132 can be part of the host OS 230 in some systems. The hypervisor 132 includes the redirection module 136, as described in FIG. 1, to redirect a rendering request to the host's graphics driver 240. The redirection allows the host's graphic driver 240 to command the graphics processing units 135 to render graphics, including still images and video.

In one embodiment, each virtual machine 131 includes a guest OS 210 and a virtual graphics device 220. The virtual graphics device 220 is a software construct that optimizes the graphics data sent over to the remote clients 101. The guest OS 210 includes a para-virtualization driver 260, which is a virtualized graphics driver that communicates with the virtual graphics device 220. Para-virtualization is a technique for improving performance of the guest OS 230 that runs on a virtual machine.

In one embodiment, when the virtual graphics device 220 receives drawing commands from the guest OS 230, it stores the commands as a display list. A display list is an encoded list of commands for reconstructing a scene (e.g., an image). A display list is constructed to optimize the data sent from the host 103 to the remote clients 101 in accordance with a remote graphics protocol (e.g., the remote desktop protocol (RDP), the virtual network computing (VNC), etc.). For example, a display list can describe the location of a start button, the size of a display window, the type of the browser that runs in the display window, etc. The display list is designed to be rendered into pixels by a remote viewer (e.g., the remote client 101 of FIG. 1), which is typically on a different machine (e.g., a thin client on a desk). When the remote viewer connects to the virtual machine 131, the virtual graphics device 220 sends this display list to the viewer for rendering.

In some scenarios, it may be necessary to take a screenshot locally at the host 103, which means rendering an image locally at the host 103. For example, if the remote viewer is not yet connected to the virtual machine 131, the virtual graphics device 220 will have to store the drawing commands (or a representation of the drawing commands, e.g., the display list) locally. At some point, the space for storing the drawing commands (or a representation thereof) can exceed the space it takes to draw the scene locally. In an embodiment where the drawing commands are stored as a display list, the virtual graphics device 220 can "flatten" the display list into a real image (i.e., pixels) and restarts a new display list from that point. Flattening a display list means rendering an image according to the display list. After flattening the current display list, the virtual graphics device 220 can start from this rendered image and adds new drawing commands (or a representation thereof) on top of the rendered image.

In one embodiment, when the virtual graphics device 220 determines to flatten a display list, it sends a rendering request to the hypervisor 132. The redirection module 136 in the hypervisor 132 redirects the request to the graphics drivers 240, which commands the graphics processing units 135 to perform the requested rendering operation. The hypervisor 132 can assign any portion of the total processing power possessed by the graphics processing units 135 to the virtual machine 131 with which the virtual graphics device 220 is associated. In an embodiment where multiple virtual machines 131 are processing drawing commands, the hypervisor 132 can assign each graphics processing unit 135 to more than one virtual machine 131. The redirection and rendering operations are described in greater detail with reference to FIG. 3.

Figure 3:
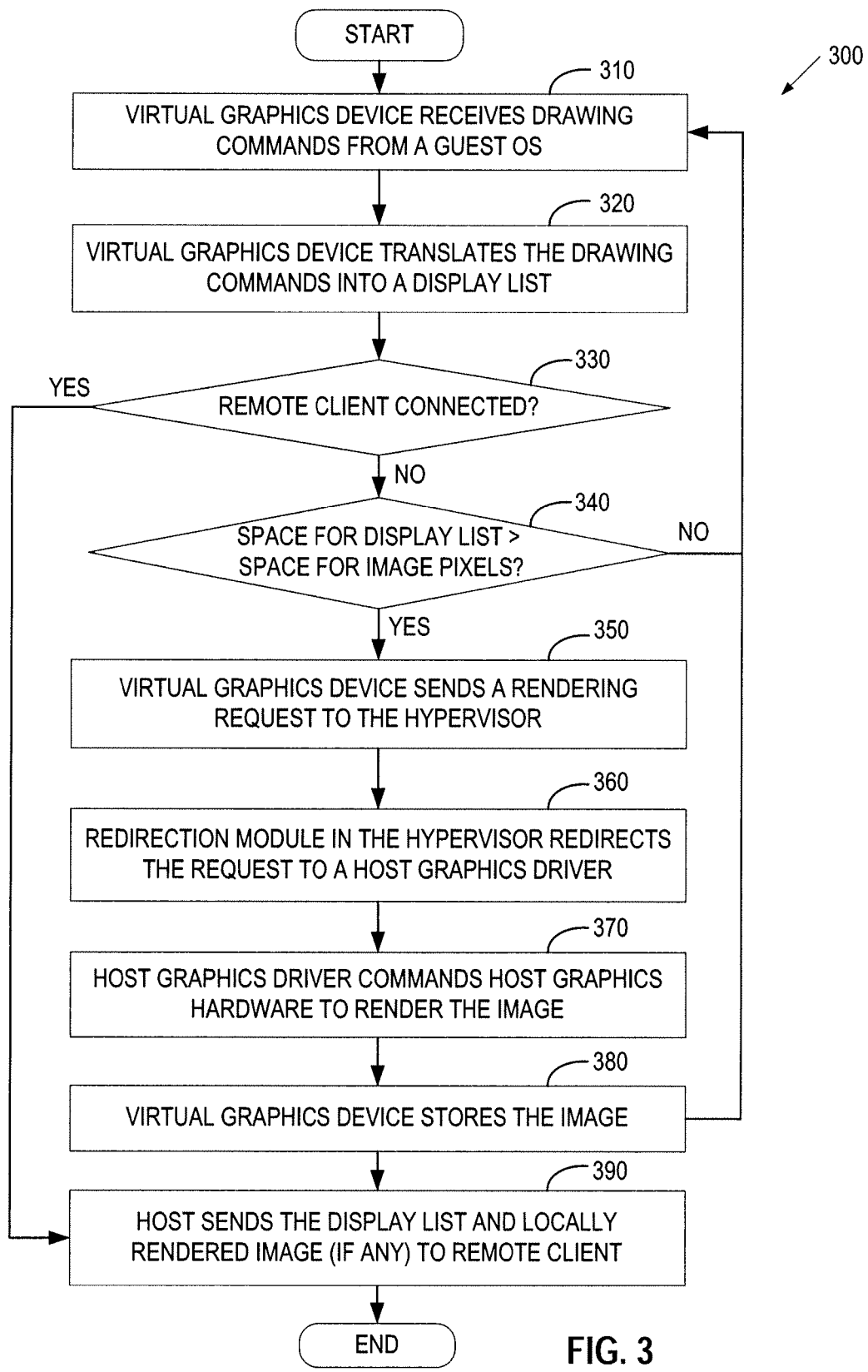
FIG. 3 is a flow diagram illustrating a method for performing host-side graphics rendering, in accordance with one embodiment of the present invention.

FIG. 3 is a flow diagram illustrating one embodiment of a method 300 for redirecting a rendering request to the graphics hardware on a host that runs multiple virtual machines. The method 300 may be performed by processing logic 426 of FIG. 4 that may comprise hardware (e.g., circuitry, dedicated logic, programmable logic, microcode, etc.), software (e.g., instructions run on a processing device to perform hardware simulation), or a combination thereof. In one embodiment, the method 300 is performed by the host 103 (FIGS. 1 and 2).

At block 310, the method 300 starts with the guest OS 210 of one of the virtual machines 131 sending drawings commands to the virtual graphics device 220. At block 320, the virtual graphics device 220 translates the drawings commands into a display list and stores the display list in local storage. At block 330, the host 103 determines whether the remote client 101 associated with the virtual machine 131 is currently connected to the host 103. If the remote client 101 is connected, then the virtual graphics device 220 sends the display list to the remote client for graphics rendering at block 390. The method 300 then terminates.

However, if at block 330 the remote client 101 is not connected to the host 103, then the method 300 continues to block 340 to determine whether it takes more space to store the display list than to store a rendered image (in pixels). If it takes more space to store the display list than to store a rendered image, then at block 350, the virtual graphics device 220 sends a rendering request to the hypervisor 132 to render the image locally on the host 103. At block 360, the redirection module 136 in the hypervisor 132 redirects the request to a host graphics driver. At block 370, the host graphics driver 240 commands the graphics processing units 135, or a fractional portion thereof that is allocated to the associated virtual machine, to render the image. At block 380, the virtual graphics device 220 stores the rendered image, and continues to receive, translate and store newly received drawing commands as a display list until the remote client 101 is connected. At block 390, after the remote client 101 is connected, the host 103 sends the rendered image along with the additional display list to the remote client 101. The method 300 then terminates.

One advantage of the embodiments described herein is that every virtual machine has an associated virtual graphics device. On a host that runs multiple virtual machines, their associated virtual graphics devices can be allocated among one, multiple, or any configurable number of graphics processing units (GPUs) in the host.

A conventional technique allocates an entire Peripheral Component Interconnect (PCI) peripheral device to a virtual machine. The guest then runs a native graphics driver on this redirected device. This conventional technique allows for very high performance in some situations, but has some drawbacks that the described embodiments do not. The drawbacks come from that the native driver is written as though it is the only thing using the entire device, and does not expect to be sharing resources with other guests. As the entire device is redirected to the guest, the entire device can only be used by one guest at a time. One remedy is to change the native driver to accommodate device sharing. However, having a complete device view in every guest would allow information to leak from one guest to another, with security only enforced by the driver itself. For example, guest A could take a screenshot of guest B's screen. An alternative remedy is to install multiple GPUs on the host machine. But installation of multiple GPUs requires additional physical space, and each GPU would likely be underutilized, thus wasting power.

In contrast, embodiments of the present invention, as described above, do not expose any real hardware directly to the guests. The hypervisor OS (e.g., the hypervisor 132 of FIGS. 1 and 2) enforces separation between guests, and multiplexes rendering from among the guests to the real GPU.

Figure 4:
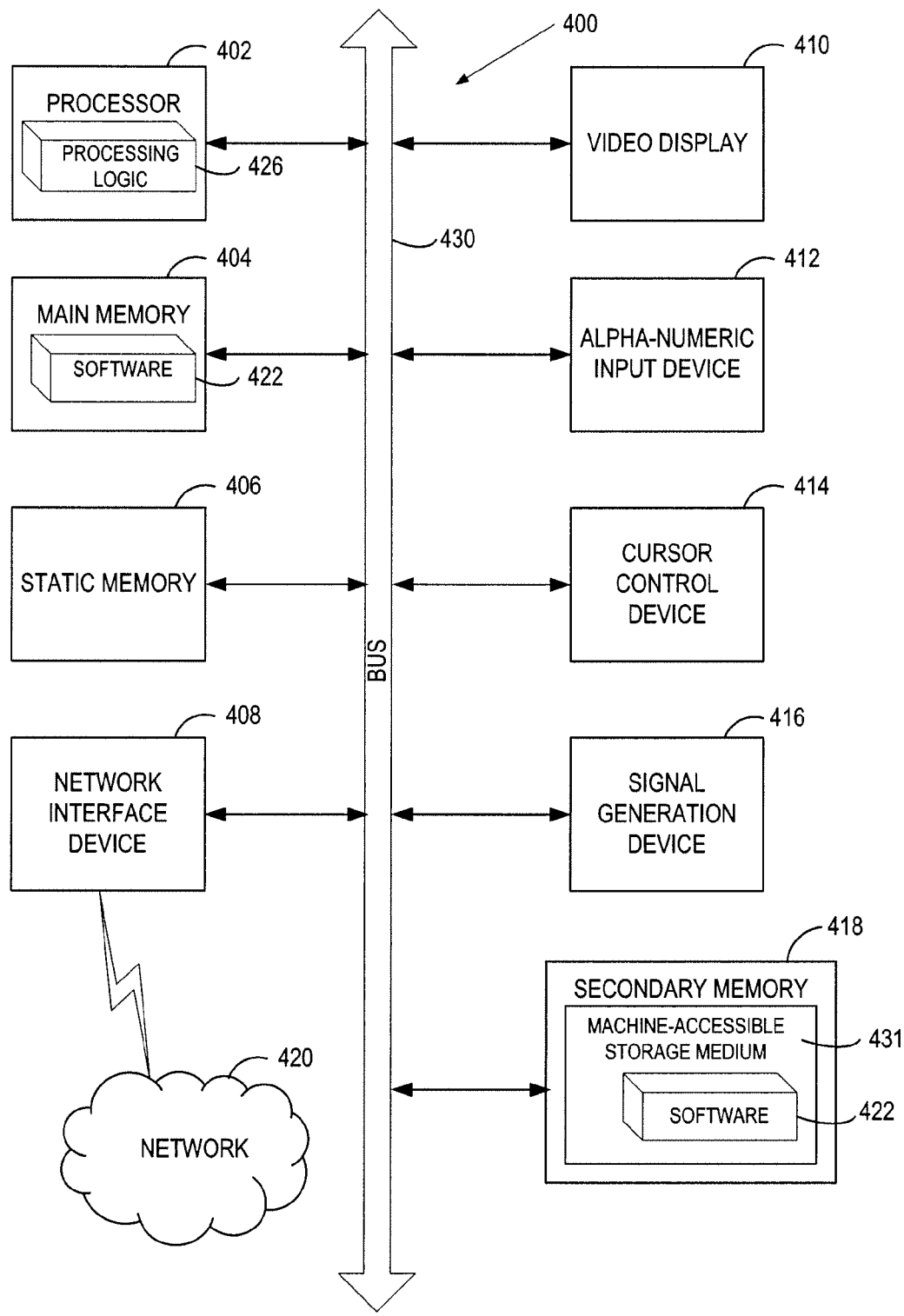
FIG. 4 illustrates a diagrammatic representation of a machine in the exemplary form of a computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

The machine-readable storage medium 431 may also be used to store redirection module 136 (FIGS. 1 and 2). While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving a representation of drawing commands issued by a guest operating system (OS) of one of a plurality of virtual machines hosted by a server; and
   causing, by a processing device, an allocated portion of a graphics processing unit on the server to render an image according to the representation of drawing commands, the graphics processing unit being allocated to the plurality of virtual machines.

2. The method of claim 1, further comprising:
   receiving a rendering request from the one of the virtual machines; and
   redirecting the rendering request to a graphics driver, the graphics driver to command the graphics processing unit to render the image.

3. The method of claim 1, further comprising:
   translating the representation of drawing commands into a display list by a virtual graphics device associated with the guest OS, the display list being an encoded list of commands describing the image to be viewed on a remote client.

4. The method of claim 1, further comprising:
   storing the image rendered by the graphics processing unit on the server;
   continuing to receive new drawing commands from the guest OS; and
   sending the image and a representation of the new drawing commands to a remote client when the remote client connects to the virtual machine.

5. The method of claim 1, further comprising:
   comparing, by a virtual graphics device associated with the guest OS, a space occupied by the representation of drawing commands with a space occupied by the image to be rendered; and
   determining, by the virtual graphics device, when to send a rendering request to render the image by the server.

6. The method of claim 1, wherein the guest OS of each virtual machine is associated with a separate virtual graphics device.

7. A system comprising:
   a server to host a plurality of virtual machines, the server comprising a graphics processing unit,
   the graphics processing unit allocated to the plurality of virtual machines to render images for the virtual machines, wherein an allocated portion of the graphics processing unit renders an image according to a representation of drawing commands issued by a guest operating system (OS) of one of the plurality of virtual machines.

8. The system of claim 7, further comprising:
   a redirection module on the server, the redirection module to receive a rendering request from the one of the virtual machines and to redirect the rendering request to a graphics driver, which commands the graphics processing unit to render an image.

9. The system of claim 8, wherein the redirection module is part of a hypervisor that runs on the server to emulate hardware for the virtual machines.

10. The system of claim 7, further comprising:
    a virtual graphics device on each virtual machine, the virtual graphics device to translate drawing commands from a guest OS into a display list, wherein the display list is an encoded list of commands that describes an image to be viewed on a remote client.

11. The system of claim 7, further comprising:
    a virtual graphics device on each virtual machine, the virtual graphics device to determine when to send a rendering request to render an image by the server.

12. The system of claim 7, further comprising:
    a network interface coupled to the server, the network interface to connect the server to remote clients on which the rendered images are to be viewed.

13. The system of claim 7, wherein the server further comprises a processing device, the processing device to cause the allocated portion of the graphics processing unit to render the image according to the representation of drawing commands.

14. A non-transitory computer readable storage medium including instructions that, when executed by a processing device, cause the processing device to perform operations comprising:

receiving a representation of drawing commands issued by a guest operating system (OS) of one of a plurality of virtual machines hosted by a server; and causing an allocated portion of a graphics processing unit on the server to render an image according to the representation of drawing commands, the graphics processing unit being allocated to the plurality of virtual machines.

15. The non-transitory computer readable storage medium of claim 14, wherein the operations further comprise:

receiving a rendering request from the one of the virtual machines; and redirecting the rendering request to a graphics driver, the graphics driver to command the graphics processing unit to render the image.

16. The non-transitory computer readable storage medium of claim 14, wherein the operations further comprise:

translating the representation of drawing commands into a display list by a virtual graphics device associated with the guest OS, the display list being an encoded list of commands describing the image to be viewed on a remote client.

17. The non-transitory computer readable storage medium of claim 14, wherein the operations further comprise:

storing the image rendered by the graphics processing unit on the server;

continuing to receive new drawing commands from the guest OS; and sending the image and a representation of the new drawing commands to a remote client when the remote client connects to the virtual machine.

18. The computer readable storage medium of claim 14, wherein the operations further comprise:

comparing, by a virtual graphics device associated with the guest OS, the space occupied by the representation of drawing commands with a space occupied by the image to be rendered; and determining, by the virtual graphics device, when to send a rendering request to render the image by the server.

19. The non-transitory computer readable storage medium of claim 14, wherein the guest OS of each virtual machine is associated with a separate virtual graphics device.

\* \* \* \* \*